June 4, 1957      H. A. LOZEAU      2,794,905
RAILROAD INSPECTOR'S LAMP
Filed March 15, 1954
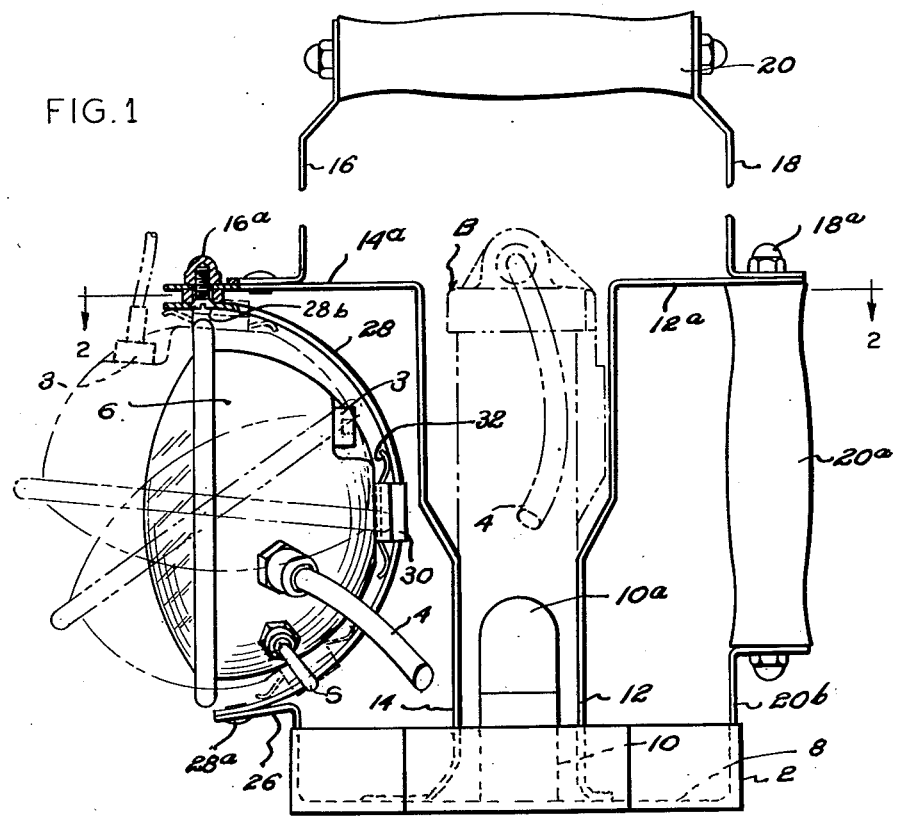
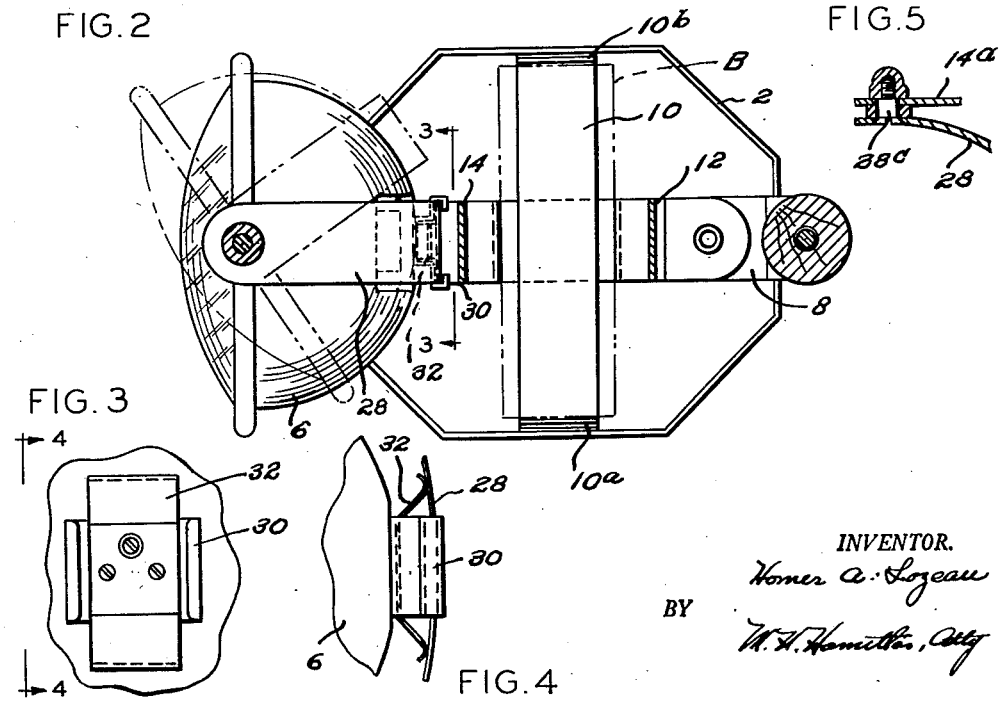
INVENTOR.
Homer A. Lozeau
BY
W. H. Hamilton, Atty.

United States Patent Office 2,794,905
Patented June 4, 1957

2,794,905
RAILROAD INSPECTOR'S LAMP

Homer A. Lozeau, Worcester, Mass., assignor to Koehler Manufacturing Company, Marlborough, Mass., a corporation of Massachusetts Application March 15, 1954, Serial No. 416,132

6 Claims. (Cl. 240—10.63)

This invention relates to an improved battery-operated hand lamp and, especially to a battery and lamp carrier structure designed primarily for use in containing a battery and lamp of the type which are normally connected together by a flexible electrical cable.

In connection with the inspection of railroad cars, there is a need at some points for directing light upwardly at varying angles in order to inspect the undersides of railroad cars and, at other points, the need is for directing light downwardly to inspect the interior of tanks, for example. It is likewise important for the inspector to be able to quickly and conveniently move a lamp member of the type indicated from one point to another and yet to be able to fix the lamp in any desired position without resorting to a troublesome pivotal joint which must be locked with a wing nut or similar fastening.

It is an object of the present invention to provide an improved portable lamp and lamp carrier structure and to devise an adjustable mounting for supporting a connected battery and lamp unit so that the lamp may be moved along an arcuate path throughout a range of positions required in inspecting a railroad car.

Another object of the invention is to provide in a carrier frame means for releasably and adjustably supporting both a lamp and battery in a manner such that the lamp housing may be moved into a convenient position to provide access to a battery-charging receptacle in the lamp housing.

These and other objects and novel features will be more fully understood and appreciated from the following description of a preferred embodiment of the invention selected for purposes of illustration and shown in the accompanying drawings, in which:

Fig. 1 is a side elevational view of the improved lamp and carrier structure of the invention also indicating, in broken lines, a battery supported thereon;

Fig. 2 is a plan cross-sectional view taken on the line 2—2 of Fig. 1;

Fig. 3 is a fragmentary detail elevational view of lamp attachment means;

Fig. 4 is a fragmentary side elevational view of the structure shown in Fig. 3; and Fig. 5 is a detail cross-sectional view of a modified pivot arrangement for the lamp.

In accordance with the invention, I have devised a novel battery and lamp carrier structure which is adapted to be suspended below a horizontally disposed handle so that the lamp and carrier may be conveniently carried at the side of an inspector and turned by hand from one side to another. In this carrier structure, I have incorporated, as an integral part thereof, a unique battery holder frame which is located approximately centrally of the carrier to provide for a desirable balanced relationship of parts.

In the battery holder frame, I have further provided for a relationship of parts such that the holder frame at an upper side is open to facilitate movement of an electrical cable when it is desired to vary the position of a lamp connected to the battery by the cable.

I have also devised a special lamp housing cradle which is supported between the battery holder frame and the carrier base and in predetermined relationship with respect to the handle, so that the center of a lamp member may be adjusted through a vertical plane passing through the longitudinal axis of the handle.

The lamp cradle may further include independently operated means for moving the center of the lamp about a vertical axis which also lies in the same vertical plane passing through the axis of the handle member.

Referring in greater detail to the lamp carrier structure shown in the drawings, numeral 2 indicates a base which may, for example, comprise a strip of metal folded or bent along vertical lines of folding to form a substantially octagonally-shaped enclosure open at both its top and bottom sides. The base thus comprised forms a pedestal which is both light and strong for placing the lamp carrier on any desired supporting surface when so desired.

It should be understood, however, that in most cases the lamp carrier will be carried in the hand of an inspector and the various component parts of the carrier have been designed to facilitate the operation of both carrying the lamp at the side and providing for varying the angle at which rays of light may be directed from time to time. To this end, I have provided in the base member, 2, a special battery holder frame for holding a battery, B, which has been indicated in broken lines in Fig. 1 and which is preferably of a type such that it may be connected through a receptacle, 3, in a lamp housing, 6, to a battery-charging apparatus in order to be renewed. The battery is connected by an electrical cable, 4, to the lamp, 6. A suitable switch is shown at S in the drawings, this switch being of conventional form controlling the circuit to the lamp.

The battery holder frame of the invention is made up of several component parts, including a bottom strip of material, 8, secured between two opposite sides of the base, as shown in Fig. 2; a second strip, 10, disposed on the bottom part, 8, at right angles to it; and two other strips, 12 and 14, which are secured in spaced relation directly upon the bottom, 8, and at right angles to the strip, 10. The strip, 10, is preferably formed of a material such as steel and has rounded upright extremities, 10a and 10b, which extend upwardly for a short distance above the base, 2, as noted in Fig. 1, to constitute two sides of the battery holder frame. These strips are located a distance apart such that they are adapted to resiliently engage two opposite sides of the battery, B. The strips, 12 and 14, are constructed so as to engage against opposite sides of the battery, B, for a part of their length. Thereafter, these strips, 12 and 14, extend outwardly from the battery, as shown, and then upwardly to points just above the top of the battery.

From the points noted, the strips then extend horizontally outwardly to comprise a pair of supporting arms, 12a and 14a. I also mount on the arms, 12a and 14a, a pair of handle brackets, 16 and 18, secured by fastenings as cap nuts, 16a and 18a. Between the ends of these brackets is horizontally mounted a handle member, 20.

It is pointed out that, by the arrangement of parts described, the battery, B, may be conveniently supported on the base, as suggested in Fig. 1, and the battery may, when desired, be removed completely from the holder. It is also pointed out that the handle, 20, is spaced above the battery a suitable distance to permit the battery to be removed from either side of the holder. Attention is also directed to the fact that, by the particular arrangement of battery holder parts described, the holder is open at the side where the electrical cable, 4, is attached and there is afforded a clearance for the cable to move when the lamp housing, 6, is changed from one position to another as hereinafter described.

In accordance with the invention, I combine with the base and holder frame described a special lamp housing cradle assembly which is made up of a lower extension piece, 26, the upper extension arm, 14a, noted above, and a curved slide element, 28. The lower end of the slide, 28, is secured by a pin or a rivet member, 28a, and the upper end of the slide is adjustably secured by a cap nut arrangement, 28b, such as that illustrated in Fig. 1. By means of the cap nut noted, the slide may be fixed in any desired position. Normally, the slide is centered so that a vertical plane passing centrally through the slide will pass through a longitudinal axis of the handle, 20. It may, in some cases, however, be desired to provide for adjusting the slide about a vertical axis and, where this is the case, the upper end of the slide may be secured by a screw member, such as 28c, illustrated in Fig. 5.

Also included in the cradle assembly is a channel guide, 30, having attached to it a curved spring, 32, better shown in Figs. 3 and 4. The guide is attached centrally at the rear surface of the lamp member, 6, and is adapted to thereby support the lamp in the manner shown in Figs. 1 and 2.

It will be apparent that, by means of the curved slide and channel guide arrangement described, the lamp may be conveniently held in the hand and quickly rotated about a horizontal axis to direct rays of light either upwardly or downwardly and to thereby greatly facilitate the operation of inspecting the underside of a railroad car or the interior of a tank.

An important feature of this arrangement is the manner in which the channel guide member 30 may, in its centered position guide the slide, so that the vertical center of the lamp 6, travels along an arcuate path and through a single vertical plane which passes through the axis of the handle, 20. This, it is found, allows the lamp to be held in the hand in the most comfortable position, from which position the carrier structure may be most conveniently moved about while supporting the lamp itself in any given position of inclination in the cradle assembly.

It will be observed that the flexibility of adjustment is provided without interference between the connected electrical cable, 4, and other parts of the carrier structure. It should also be noted that I have, by means of the arcuate spring, 32, provided a novel means of fixing the lamp in any desired position. The two ends of the spring, 32, engage against the inner surfaces of the slide, 28, and thus develop a frictional holding force of sufficient magnitude to maintain the lamp as desired.

Another important feature of the cradle structure is the arrangement of the slide, 28, directly over the battery-charging receptacle, 3, earlier noted and as shown in Fig. 1 recessed in one side of the lamp housing, 6. The charging receptacle can be connected by means of an electrical plug to a charging apparatus and a charging operation through the lamp housing to the battery, B, is safely and conveniently carried out. By locating the slide, 28, directly over the receptacle, 3, it will be observed that the receptacle is maintained in a shielded position and, therefore, there is no opportunity for accidental contact with the terminals by an operator when the lamp housing is in an operative position. However, in order to move the receptacle, 3, into a position in which it may receive an electrical plug, it is merely necessary to pivot or rotate the lamp housing about a horizontal axis in the manner suggested in Fig. 1, for example, into the dotted line position shown in that figure. This exposes the receptacle, 3, and the charging operation can then be readily carried out. It is again pointed out that this adjustment of the lamp housing into a position in which a charging operation can be carried out is facilitated by the skeletonized framework of the battery holder which permits the electrical cable to move without interference in any of the positions noted.

In certain instances of space limitations, it is found that it may be necessary to hold the lamp by means of the handle, 20, with the latter member extending forwardly, and to be able to not only locate the lamp in some particular position of rotation about a horizontal axis but also to adjust the lamp about a vertical axis as well. Fig. 2 illustrates the slide of the invention pivoted about a vertical axis to furnish adjustability in this specific manner.

In still other cases, it may be desired to move the lamp about in various positions of angularity for railroad signalling purposes and to be able to grasp the carrier structure from a point in back of the lamp rather than above it to facilitate such signalling. For this purpose, I have also provided a handle, 20a, which may, for example, be secured between an extension piece, 20b, and extension arm, 12a, as shown in Fig. 1. It will be noted that, by the particular arrangement of the holder frame strips, I am enabled to locate the axis of this handle, 20a, in the same vertical plane which passes through the handle, 20, to thus preserve a balanced relationship of parts, irrespective of whether the carrier is held from the top or the rear.

From the foregoing description, it will be evident that I have devised a novel skeletonized framework for holding a battery and lamp in an operating position and for moving the lamp into a charging position without interference with the lamp supporting parts of the carrier. The framework is so fabricated that it may be readily attached to an open base to provide upper and lower suspension points from which a lamp cradle structure may be swung to afford an unusually effective degree of flexibility.

While I have shown a preferred embodiment of the invention, it should be understood that various changes and modifications may be resorted to in keeping with the spirit of the invention as defined by the appended claims.

Having thus described my invention, what I claim is:

1. A battery-operated hand lamp including a lamp carrier having a base, a battery holder frame mounted in the base and projecting above and laterally over the base to form a recess, a lamp housing having a lamp therein, a lamp cradle mounted between the laterally projecting portion of the base and the said holder frame for supporting the lamp housing in recessed relation to the top of the said holder frame, and means cooperating with the said cradle for supporting the lamp housing for rotation about a horizontal axis.

2. A structure as defined in claim 1 in which said means includes a curved slide element for guiding the center of said lamp housing along an arcuate path and through a single vertical plane when the lamp is rotated about the said horizontal axis of rotation.

3. An article of the class described comprising a base, a battery-holder frame mounted on the base, said frame including a top section which overhangs the said base, a lamp member, cradle means for adjustably supporting the lamp member for rotation about a horizontal axis, said cradle means including a curved slide which extends downwardly from the overhanging top section of the frame and inwardly to define a recessed slideway for receiving the lamp member in a partially shielded position, and a channel member fixed to the back of the lamp member and slidably engaged on the said curved slide.

4. A structure as defined in claim 3 including spring means for resiliently holding the lamp member and channel member in any desired position of adjustment on the slide.

5. A structure as defined in claim 4 in which the said spring means comprises an arcuate spring element constructed and arranged to resiliently bear against the inner surface of the slide.

6. An article of the class described comprising a base, a battery holder frame mounted on the base, said battery holder frame including a pair of spaced upright members having laterally projecting upper extremities, a lamp member, cradle means for adjustably supporting the lamp member for rotation about a horizontal axis, said cradle means including an arcuate slide element connecting the laterally projecting extremity of one of said spaced uprights and said base, a guide member connecting the central portion of said lamp member with said slide to permit movement of said lamp member along an arcuate path in a vertical plane when the lamp member is rotated about said horizontal axis of rotation, and a handle horizontally supported above said holder frame, the longitudinal axis of said handle lying in said vertical plane of movement of the lamp member.

References Cited in the file of this patent

UNITED STATES PATENTS

| | | |
|---|---|---|
| 1,309,140 | Knoblock | July 8, 1919 |
| 1,592,178 | Carpenter | July 13, 1926 |
| 2,257,866 | Talbot | Oct. 7, 1941 |
| 2,611,072 | Potekin | Sept. 16, 1952 |
| 2,628,305 | Talbot | Feb. 10, 1953 |

FOREIGN PATENTS

| | | |
|---|---|---|
| 354,697 | Great Britain | 1931 |